United States Patent [19]
Karr

[11] 3,914,976
[45] Oct. 28, 1975

[54] SPLIT SHOT APPLICATOR

[76] Inventor: Harold A. Karr, 6930 Sylvan Road, Citrus Heights, Calif. 95610

[22] Filed: May 9, 1974

[21] Appl. No.: 468,579

[52] U.S. Cl. .............................. 72/410; 29/212 D
[51] Int. Cl.² ........................................ B21D 37/12
[58] Field of Search ............ 72/409, 410; 29/212 R, 29/212 D, 211 D; 81/419

[56] References Cited
UNITED STATES PATENTS

| | | | |
|---|---|---|---|
| 2,753,741 | 7/1956 | Riley | 72/409 |
| 2,765,686 | 10/1956 | Deline | 72/410 |
| 2,844,980 | 7/1958 | Johnson | 72/409 |
| 2,941,431 | 6/1960 | Christensen et al. | 29/212 D |
| 3,371,400 | 3/1968 | Edes | 29/212 D |
| 3,581,551 | 6/1971 | Wilkinson | 72/410 |
| 3,583,202 | 6/1971 | Blakeway | 72/410 |
| 3,597,775 | 8/1971 | McCasland | 72/409 |

*Primary Examiner*—Michael J. Keenan
*Attorney, Agent, or Firm*—Clarence A. O'Brien; Harvey B. Jacobson

[57] ABSTRACT

In a hand-tool, a pair of handle-operated jaws which receive a spring-fed rod therein for a severing of an end portion of the rod and a die-forming of the severed portion about a received line. In conjunction with the severing of the rod portion, a rod section immediately adjacent thereto is provided with a slit which is to receive the line as the subsequent portion of the rod is severed from the rod and die-formed about the line.

5 Claims, 9 Drawing Figures

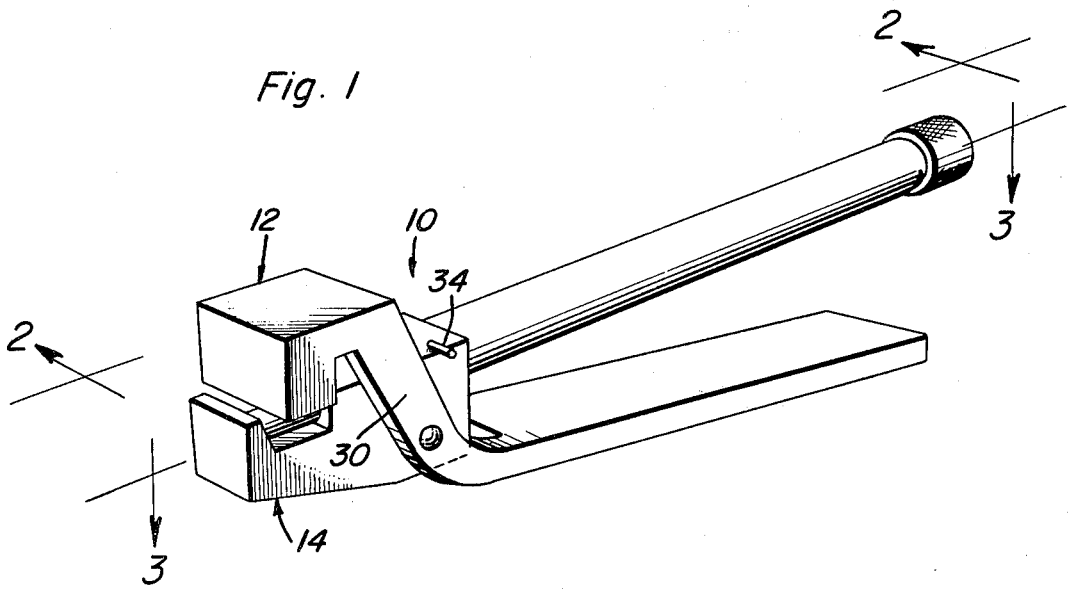
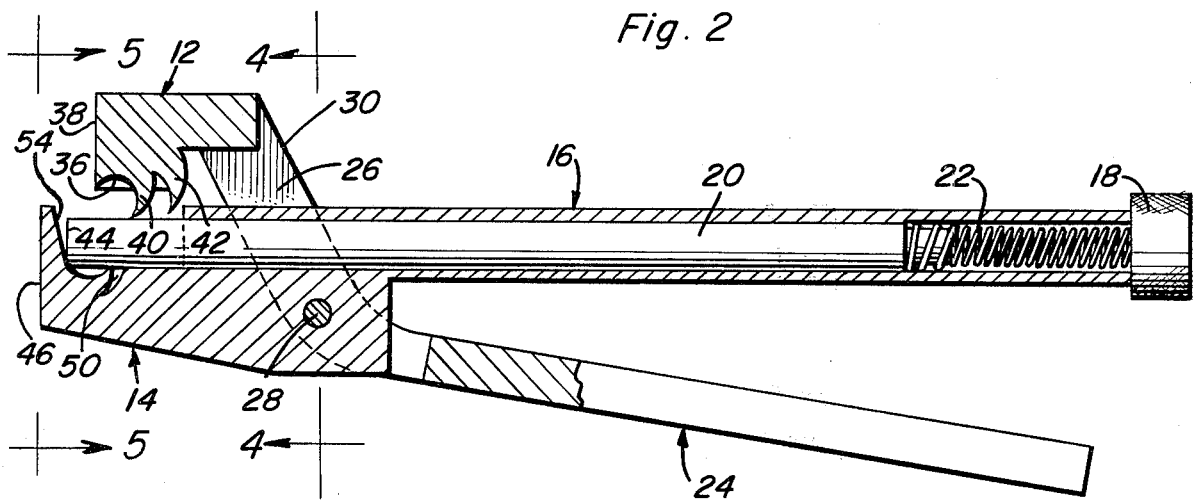
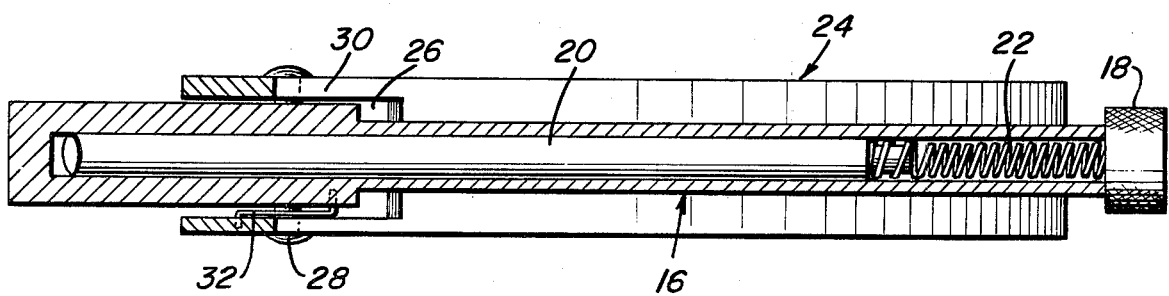

SPLIT SHOT APPLICATOR

The present invention generally relates to the attaching of split-shot weights to a fishing line, and is more particularly concerned with a unique hand-operated tool which both forms the split-shot and molds the shot to the line.

At pressent, the application of slit-shot to fishing line is normally effected by the fisherman manually notching or slitting the shot, positioning a line within the notch and squeezing the shot so as to clamp the shot to the line. This, as will be appreciated, is a tedious and time-consuming operation, particularly wherein several split-shots are to be mounted.

In an attempt to facilitate the application of split-shot to fishing lines, many devices have been devised, note for example U.S. Pat. Nos. 3,583,202 and 3,731,400, wherein preformed split-shot are loaded into a relatively complex magazine type implement for a progressive feeding and mounting of the preformed shot.

It is a primary intension of the present invention to provide a simplified although highly unique tool which completely eliminates the necessity of preforming the split-shot, utilizing instead an elongated rod blank of appropriate material, for example lead, whichis progressively fed to combined forming and applying jaws for a simultaneous forming and application of the individual shot.

Among the objects of the invention are the simplicity of design, elimination of the complex feed mechanisms associated with implements wherein preformed shot must be specifically aligned and fed into mounting position, and the provision of an implement which operates in a substantially maintenance free manner requiring only the use of a single hand.

Basically, the objects and advantaes sought herein are achieved through the provision of a hand implement incorporating a pair of opposed handle-controlled jaws. The jaws are oriented so as to automatically receive the forward end portion of a spring-biased rod blank from which the individual shot is slit, severed and die-formed about a fishing line. The opposed jaws include, for simultaneous operation, severing means, forming means and slitting means.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a perspective view of the shot applicator;

FIg. 2 is an enlarged longitudinal cross-sectional veiw through the applicator taken substantially on a plane passing along line 2—2 in FIG. 1;

FIG. 3 is a cross-sectional view taken substantially on a plane passing along line 3—3 in FIG. 1;

Figure 4:
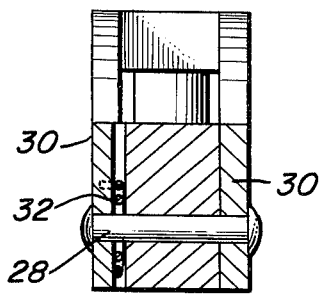
FIG. 4 is a transverse cross-sectional view taken substantially on a plane passing along line 4—4 in FIG. 2.

Referring now more specifically to the drawings, reference numeral 10 is used to designate the hand-tool or applicator. This applicator includes opposed upper and lower jaws 12 and 14, each integrally formed with an elongate manipulating handle. The handle 16, associated with the lower jaw 14, is in the nature of an elongated hollow tube opening, at the forward end thereof, into the upper face of the jaw 14. The rear of the tubular handle 16 is closed by an internally threaded cap 18 through which an elongated rod blank 20 and biasing spring 22 can be loaded as shall be described in more detail presently.

Figure 5:
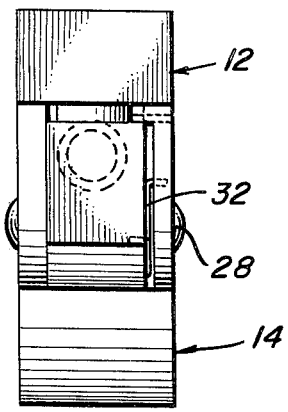
FIG. 5 is a front elevational view on a plane taken substantially along line 5—5 in FIG. 2.

The handle 24, associated with the upper jaw 12, is generally in the nature of a flat bar angling sharply downward immediately rearward of the jaw 12 and having an enlarged central opening 26 therethrough within which the block-like rear portion of the lower jaw 14 is received. Appropriate pivot pin means 28 extends through the side arms 30, formed by the central slot 26, and the slot received rear portion of the jaw 14. A movement of the handles 16 and 24 toward each other will result in a corresponding movement of the jaws 12 and 14 toward each other. The jaws are to be resiliently biased toward an open position by means of a coiled torsion spring 32 engaged therebetween about the pivot pin 28 as will be best appreciated from FIGS. 3, 4 and 5. Opening movement of the jaws will in turn be limited by an appropriate stop pin 34 fixed to the rear of the jaw 14 on one side thereof and engageable against the corresponding side arm 30 of the upper jaw 12.

The working face of the upper jaw 12 includes a molding cavity 36 immediately inward of the forward end 38 of the jaw. The inner end of the cavity 36 is defined by an elongated depending cut-off tooth 40. In inwardly spaced relation to the cut-off tooth 40 is a second depending splitting tooth 42 which is relatively shorter than the tooth 40.

The working face of the lower jaw 14 includes a molding cavity 44 immediately inward of the outside end 46 thereof and adapted so as to cooperate with the molding cavity 36 and cutting tooth 40 so as to sever and generally cylindrically mold the leading end portion of the rod blank 20 about a fishing line 48. In order to completely accommodate the leading portion of the cutting tooth 40, a tooth receiving recess 50 is provided immediately inward of the molding cavity 44 whereby a complete severing of the leading portion of the rod 20 is effected as an initial step in the forming thereof into a line mounted weight.

Figure 6:
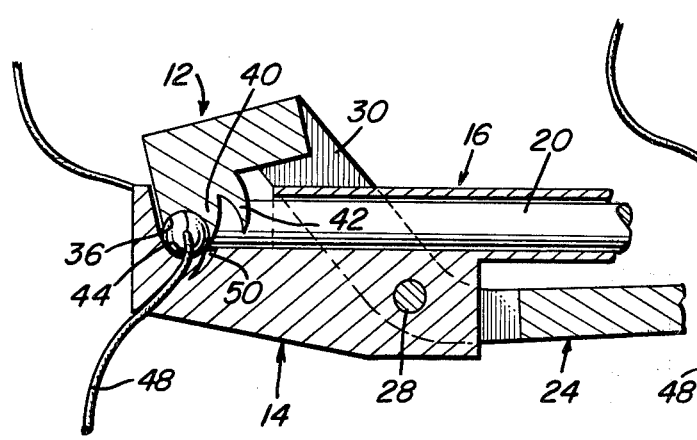
FIG. 6 is a sectional detail of the jaws at the completion of the molding and slitting movement.
Figure 7:
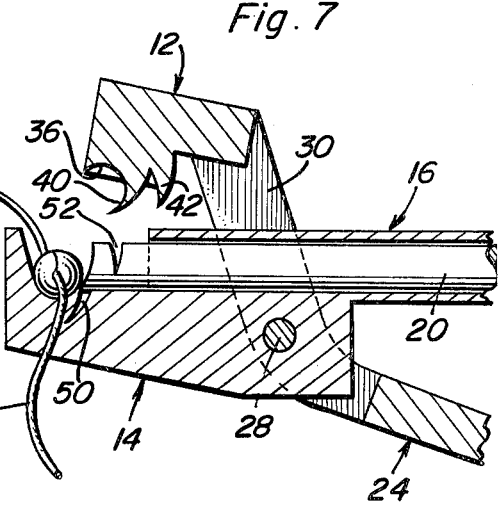
FIG. 7 is a cross-sectional detail of the jaws in the fully opened position subsequent to the mounting of a shot or shot weight.
Figure 8:
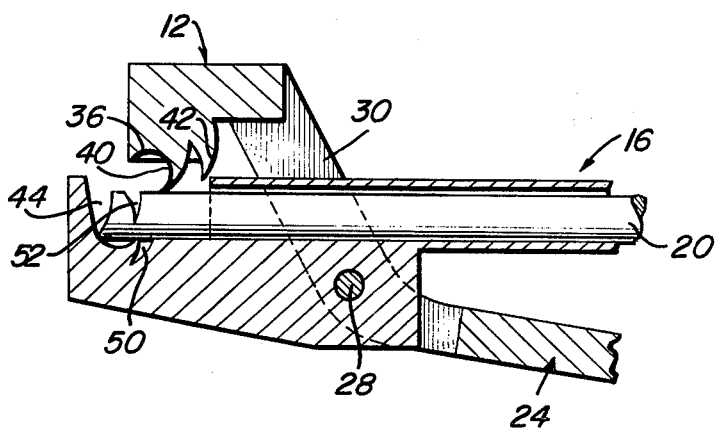
FIG. 8 is a cross-sectional detail of the jaws at the initiation of a downward shot severing and molding stroke.
Figure 9:
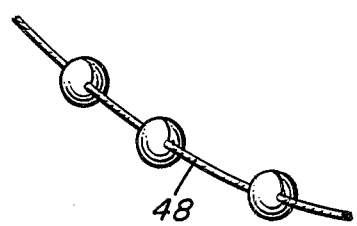
FIG. 9 illustrates, in perspective, a fishline with multiple shots or shot weights mounted thereon.

Simultaneously with the forming of the line mounted weight, the portion of the rod 20 immediately inward thereof is split or slit partially therethrough by the relatively shorter splitting tooth 42. This can best be appreciated from FIGS. 6 and 7. The split 52, formed by the tooth 42, is provided for the accommodation of the line 48 as the subsequent split portion of the rod 20 is advanced into the lower die cavity. The open forward end of the rod receiving tube, as will be appreciated from the drawings, is so orientated as to allow for movement of the rod 20 into the lower cavity 44, stopping against the front abutment wall 54 thereof. The rod 20 is automatically advanced by the compressed coiled compression spring 22 which is preferably frictionally engaged with the following end of the rod 20, as by telescoping over a portion thereof, so as to prevent rotation of the rod 20 as it is progressively advanced. The retention of the rod 20 in a non-rotating manner is considered highly desirable so as to always insure that the line receiving split 52 is upwardly orientated for a facilitation of the insertion of the fishing line. As will be appreciated, when a new rod 20 is inserted into the device 10, the initial severed portion of the rod 20 will not have the split 52 therein. However, after a severing of this initial portion, each subsequent portion of the rod will incorporate the split.

It is contemplated that the device 10 be easily manipulated by a single hand, the rod material corresponding to that from which conventional split-shot weights are formed, for example easily moldable lead.

Thus, in operation, a rod blank 20 is inserted into the tubular handle 16, followed by the biasing spring 22 and sealed therein by means of the end cap 18. The forward end of the rod projects into the lower forming cavity 44, engaging against the abutment wall 54 thereof. An initial manipulation of the handle removes the forward tip of the rod and provides a line receiving slit immediately inward thereof. A release of the handle results in an automatic opening of the jaws, at which time the rod blank 20 is shifted forward after the forward tip of the rod is removed. The line is then positioned in the split 52 and the jaws again closed, severing the forward portion of the rod and molding the severed portion into a line clamped weight.

The apparatus is considered particularly unique in that it eliminates the necessity of preforming the split-shot, as well as the inhert difficulty in mounting such preformed shot, even in automatic equipment wherein the shot must be loaded and continually properly positioned. The apparatus herein, on the contrary, merely utilizes an elongated piece of blank material from which portions are severed as required and effectively mounted directly on the line.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A hand-tool for forming and applying weights to a line comprising a pair of jaws, said jaws having opposed working faces, means for selectively closing and opening said jaws relative to each other, means for progressively feeding a length of weight material between said jaws, said jaws including means for severing a portion of the length of material and means for locking the severed portion of material about a line positioned between the jaws, the means for severing a portion of the length of material comprising a cut-off tooth on one jaw and a tooth-receiving recess in the second jaw for reception of the cut-off tooth upon a closing of the jaws, said cut-off tooth severing a portion of the length of material from the length of material, and a splitting tooth located inward of the cut-off tooth, said splitting tooth being relatively shorter than the cut-off tooth and, upon a closing of the jaws, forming a split partially through the length of material inward of the severed portion.

2. A hand-tool for forming and applying weights to a line comprising a pair of jaws, said jaws having opposed working faces, means for selectively closing and opening said jaws relative to each other, means for progressively feeding a length of weight material between said jaws, said jaws including means for severing a portion of the length of material and means for locking the severed portion of material about a line positioned between the jaws, the means for severing a portion of the length of material comprising a cut-off tooth on one jaw and a tooth-receiving recess in the second jaw for reception of the cut-off tooth upon a closing of the jaws, said cut-off tooth severing a portion of the length of material from the length of material, the means for locking the severed portion of material comprising a pair of opposed cooperating molding cavities on said jaws respectively outward of the cut-off tooth and the tooth-receiving recess to engage and mold the severed portion of material, and a splitting tooth located inward of the cut-off tooth, said splitting tooth being relatively shorter than the cut-off tooth and, upon a closing of the jaws, forming a split partially through the length of material inward of the severed portion.

3. The tool of claim 2 wherein the means for selectively opening and closing said jaws includes an elongated handle projecting from each jaw.

4. The tool of claim 3 wherein the means for progressively feeding a length of weight material includes an elongated hollow tube defined by one of said handles for the reception of a length of material and a biasing spring for maintaining a constant force on said length of material for movement thereof to and between said jaws.

5. The tool of claim 2 wherein the means for progressively feeding a length of weight material comprises an elongated tubular member rigid with and projecting from one of said jaws, said tubular member opening toward said jaw and receiving a length of weight material and an internal biasing spring urging said material outward toward said associated jaw.

* * * * *